(12) United States Patent
Saijo et al.

(10) Patent No.: US 7,438,230 B2
(45) Date of Patent: Oct. 21, 2008

(54) IMAGE PROCESSING APPARATUS, IMAGE PROCESSING METHOD, AND IMAGE PROCESSING PROGRAM

(75) Inventors: Masashi Saijo, Kawasaki (JP); Kiyoshi Miyazaki, Kawasaki (JP); Kenichi Haruki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/686,045

(22) Filed: Mar. 14, 2007

(65) Prior Publication Data

US 2007/0154197 A1 Jul. 5, 2007

Related U.S. Application Data

(63) Continuation of application No. PCT/JP2004/133365, filed on Sep. 14, 2004.

(51) Int. Cl.
G06K 7/10 (2006.01)
(52) U.S. Cl. .................... 235/454; 235/462.25
(58) Field of Classification Search ..................
235/462.01–462.45, 455, 470, 472.01, 472.02,
235/472.03, 454; 382/128, 275, 279; 358/1.9,
358/482
See application file for complete search history.

(56) References Cited

U.S. PATENT DOCUMENTS

| 5,383,457 | A * | 1/1995 | Cohen ................... 600/443 |
| 5,760,403 | A * | 6/1998 | Elabd ................. 250/370.11 |
| 5,884,042 | A * | 3/1999 | Winter et al. ............ 709/231 |
| 6,118,474 | A * | 9/2000 | Nayar ..................... 348/36 |
| 6,388,768 | B2 * | 5/2002 | Hada et al. ............... 358/1.9 |
| 6,603,514 | B1 * | 8/2003 | Tsai et al. ................ 348/345 |
| 2001/0015815 | A1 * | 8/2001 | Hada et al. ............... 358/1.9 |
| 2003/0095699 | A1 * | 5/2003 | Hung et al. ............... 382/149 |
| 2003/0117511 | A1 * | 6/2003 | Belz et al. ............ 348/333.11 |
| 2003/0169944 | A1 * | 9/2003 | Dowski et al. ............ 382/279 |
| 2003/0174230 | A1 | 9/2003 | Ide et al. |
| 2003/0215791 | A1 * | 11/2003 | Garini et al. ................ 435/5 |
| 2004/0190762 | A1 * | 9/2004 | Dowski et al. ............ 382/128 |

FOREIGN PATENT DOCUMENTS

JP 62-173876 7/1987

(Continued)

OTHER PUBLICATIONS

International Search Report of International Application No. PCT/JP2004/013365 (mailed Jun. 28, 2005.).

(Continued)

Primary Examiner—Thien M Le
(74) Attorney, Agent, or Firm—Staas & Halsey LLP

(57) ABSTRACT

An image processing apparatus, an image processing method, and an image processing program are provided. The processing apparatus, method, and program relate to image processing executed in an AF camera, etc., and make clear a variation in an image displayed during focusing operation. The image processing apparatus includes an image-capturing element that puts out an image formed through an optical system, a focus controlling unit that controls the optical system to locate it at a focusing position, using the image obtained by the image-capturing element through the optical system, and an image processing unit that forms a pseudo-image during focusing operation of the optical system caused by the focus controlling unit, the pseudo-image showing a resolution variation enlarged to be greater than that of the image obtained by the image-capturing element.

9 Claims, 17 Drawing Sheets

FOREIGN PATENT DOCUMENTS

| | | |
|---|---|---|
| JP | 03-260638 | 11/1991 |
| JP | 05-183796 | 7/1993 |
| JP | 07-143388 | 6/1995 |
| JP | 2003-224769 | 8/2003 |

OTHER PUBLICATIONS

Written Opinion of the ISA [PCT/JP2004/013365] mailed Jun. 28, 2005.

International Preliminary Report on Patentability, mailed Mar. 29, 2007 and issued in corresponding European Patent Application No. PCT/JP2004/013365.

Office Action issued in corresponding Japanese Patent Application No. 2006-534972, on Apr. 1, 2008.

English language translation of Japanese Office Action, mailed Apr. 1, 2008 and issued in corresponding Japanese Patent Application No. 2006-534972.

* cited by examiner

FIG. 9A (BLURRING (GAUSS))
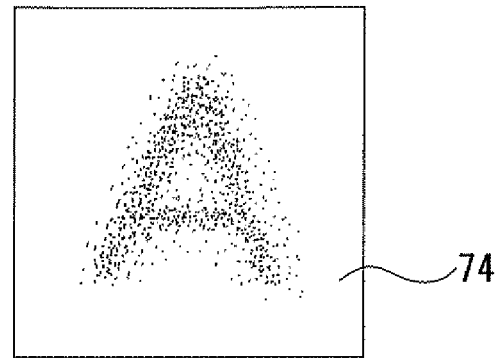
FIG. 9B (BLURRING (MOVING))
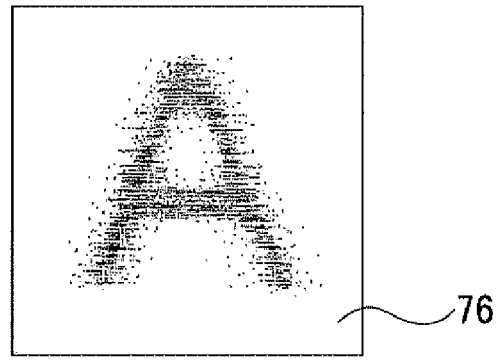

FIG.10A (ROUGHLY DRAWN) 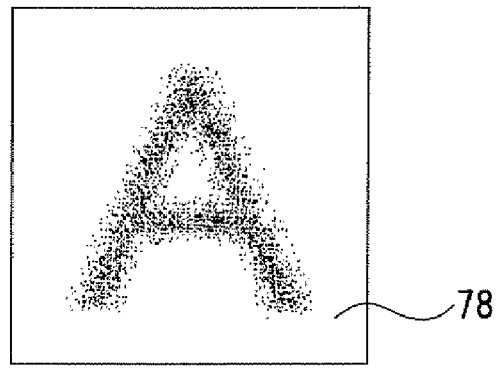
FIG.10B (DIFFUSED) 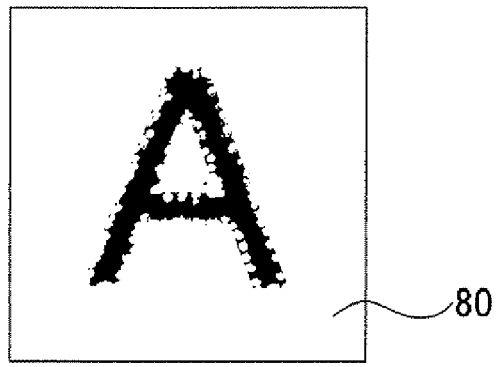
FIG.10C (WINDED) 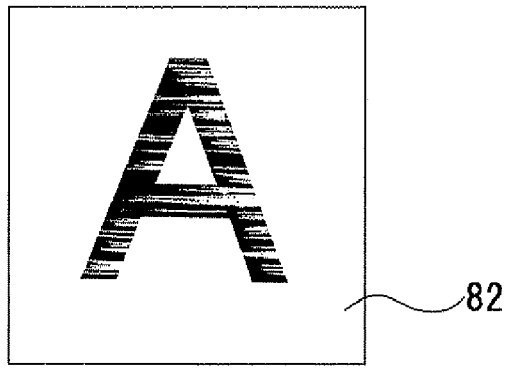

IMAGE PROCESSING APPARATUS, IMAGE PROCESSING METHOD, AND IMAGE PROCESSING PROGRAM

CROSS-REFERENCE TO RELATED APPLICATIONS

This application is a continuation of International Application No. PCT/JP2004/013365, filed on Sep. 14, 2004, now pending, herein incorporated by reference.

BACKGROUND OF THE INVENTION

1. Field of the Invention

The present invention relates generally to image processing executed in an autofocus camera, etc., and more particularly, to an image processing apparatus, an image processing method, and an image processing program that allow visual recognition of focusing operation through an image.

2. Description of the Related Art

In autofocusing (AF) operation carried out in a camera, a digital camera, etc., incorporated into a cellular phone, a portable information terminal unit (PDA: Personal Digital Assistance), etc., a lens moving mechanism is driven by a motor to move a lens physically to change its position and look for a focusing position, so that the lens is fixed at an optimum focusing position. As this focusing operation proceeds, an image formed on an image-capturing element is displayed on a monitor screen. This allows a user to visually recognize the state of image changed by the focusing operation from the monitor screen.

A focusing device disclosed in a parent document 1 shown below presents a technique related to such display of an image in a state of focusing. The focusing device forms an image according to a state of focusing by recognizing a state of focusing based on contrast information on a photographed subject and changing the frequency characteristics of an aperture compensating circuit in a processing unit.

A solid image-capturing device disclosed in a patent document 2 shown below reads image output being in focus and that being blurred separately out of a solid image-capturing element, and obtains a brightness signal from the output in focus and a color signal from the output blurred, thus offers an image of a high resolution without moiré.

A camera disclosed in a patent document 3 shown below determines a depth of field from a condition given upon photographing, and reduces the level of the edge of an image signal in a nonfocusing area, which cannot be covered by the depth of field, out of image signals read out of an image-capturing device, thus displays a state of blur in photographing on an electronic finder.

Patent document 1: Japanese Patent Application Laid-Open Publication No. 1993-183796

Patent document 2: Japanese Patent Application Laid-Open Publication No. 1987-173876

Patent document 3: Japanese Patent Application Laid-Open Publication No. 1991-260638

A cellular phone, PDA, etc., is equipped with a pan focus camera, which has a small lens and offers a greater depth of field. Executing pan focusing, this type of camera shows a user less variation in an image on a monitor screen even when a lens moves to a focusing position as a result of AF operation. Less variation in an image gives the user no sense of the completion of focusing, causing the user to feel that something is missing. This problem is not dealt with in the patent documents 1, 2, 3, and cannot be solved by considering the technical contents disclosed in the patent documents 1, 2, 3.

SUMMARY OF THE INVENTION

The object of the present invention is to make clear a variation in an image displayed during focusing operation in relation to an image process executed in an AF camera, etc.

Specifically, the object of the invention is to enable clear visual recognition of a variation in an image from the start to the end of focusing operation by giving a specific effect to a displayed image that is brought in focus.

Means for Solving the Problems

In order to achieve the above object, an image processing apparatus of the present invention comprises an image-capturing element that puts out an image formed through an optical system; a focus controlling unit that controls the optical system to locate it at a focusing position, using the image obtained by the image-capturing element through the optical system; and an image processing unit that forms a pseudo-image during focusing operation of the optical system caused by the focus controlling unit, the pseudo-image showing a resolution variation enlarged to be greater than that of the image obtained by the image-capturing element.

According to the above configuration, an actual image created through the optical system is put out of the image-capturing element during focusing operation of the optical system caused by focus control. The image processing unit then receives the actual image, forming a pseudo-image having a resolution variation increased from that of the actual image. The pseudo-image shows a greater resolution variation in its appearance from the start to just before the end of focusing operation, which gives a user a sense of the completion of focusing trough such a resolution variation, thus allows the user to feel a sense of presence and a real pleasure in photographing.

In order to achieve the above object, the image processing apparatus of the present invention may comprise a memory unit that stores the image obtained by the image-capturing element. According to the configuration, the actual image obtained by the image-capturing element is stored in the memory unit.

In order to achieve the above object, an image processing apparatus of the present invention may comprise an image-capturing element that puts out an image formed through an optical system; a focus controlling unit that controls the optical system to locate it at a focusing position, using the image obtained by the image-capturing element through the optical system; and an image processing unit that forms a pseudo-image during focusing operation of the optical system caused by the focus controlling unit, the pseudo-image having a resolution lower than that of the image obtained by the image-capturing element, and that increases the resolution of the pseudo-image step by step or consecutively to cause the resolution to reach that of the image obtained by the image-capturing element at the focusing position.

According to the above configuration, the resolution of the pseudo-image temporarily becomes lower relative to that of the actual image obtained during focusing operation, and then increases step by step or consecutively from the lower point to reach that of the image obtained by the image-capturing element at the focusing position. As a result, an image variation during focusing operation is made clear, which enables the clear visual recognition of a variation in the image from the start to the end of focusing operation.

In order to achieve the above object, an image processing method of the present invention comprises the processes of outputting an image that is formed on an image-capturing element through an optical system; controlling the optical system to locate it at a focusing position, using the resolution of the image obtained by the image-capturing element through the optical system as control information; and forming a pseudo-image during focusing operation of the optical system, the pseudo-image showing a resolution variation enlarged to be greater than that of the image obtained by the image-capturing element. According to the configuration, the pseudo-image shows a greater resolution variation in its appearance from the start to just before the end of focusing operation, which gives a user a sense of the completion of focusing, thus allows the user to feel a sense of presence and a real pleasure in photographing.

In order to achieve the above object, the image processing method of the present invention may comprise the process of causing a memory unit to store the image obtained by the image-capturing element. According to the configuration, the actual image obtained by the image-capturing element is stored in the memory unit.

In order to achieve the above object, an image processing method of the present invention may comprise the processes of outputting an image that is formed on an image-capturing element through an optical system; controlling the optical system to locate it at a focusing position, using the resolution of the image obtained by the image-capturing element through the optical system as control information; forming a pseudo-image during focusing operation of the optical system, the pseudo-image having a resolution lower than that of the image obtained by the image-capturing element; and increasing the resolution of the pseudo-image step by step or consecutively to cause the resolution to reach that of the image obtained by the image-capturing element at the focusing position.

According to the above configuration, the resolution of the pseudo-image temporarily becomes lower relative to that of the actual image obtained during focusing operation, and then increases step by step or consecutively from the lower point to reach that of the image obtained by the image-capturing element at the focusing position. As a result, an image variation during focusing operation is made clear, which enables the clear visual recognition of a variation in the image from the start to the end of focusing operation.

In order to achieve the above object, an image processing program executable by a computer of the present invention comprises the steps of taking in an image that is formed on an image-capturing element through an optical system; forming control information for controlling the optical system to locate it at a focusing position, using resolution information of the image obtained by the image-capturing element through the optical system; and forming a pseudo-image during focusing operation of the optical system, the pseudo-image showing a resolution variation greater than that of the image obtained by the image-capturing element.

According to the above configuration, the pseudo-image shows a greater resolution variation in its appearance from the start to just before the end of focusing operation, which gives a user a sense of the completion of focusing, thus allows the user to feel a sense of presence and a real pleasure in photographing.

In order to achieve the above object, the image processing program of the present invention may include the step of causing a memory unit to store the image obtained by the image-capturing element. This configuration allows storage of the actual image in the memory unit.

In order to achieve the above object, an image processing program executable by a computer of the present invention may comprise the steps of taking in an image that is formed on an image-capturing element through an optical system; forming control information for controlling the optical system to locate it at a focusing position, using resolution information of the image obtained by the image-capturing element through the optical system; and forming a pseudo-image during focusing operation of the optical system, the pseudo-image having a resolution lower than that of the image obtained by the image-capturing element; and increasing the resolution of the pseudo-image step by step or consecutively to cause the resolution to reach that of the image obtained by the image-capturing element at the focusing position.

According to the above configuration, the resolution of the pseudo-image temporarily becomes lower, and then increases step by step or consecutively from the lower point to reach that of the image obtained by the image-capturing element at the focusing position. As a result, an image variation during focusing operation is made clear, as described above, which enables the clear visual recognition of a variation in the image from the start to the end of focusing operation.

The features and advantages of the present invention are listed as follows.

(1) An image processing apparatus, an image processing method, or an image processing program according to the present invention provides a pseudo-image with an enlarged resolution variation against an actual image obtained by an image-capturing element during focusing operation of an optical system. This makes clear an image variation, which gives a user a sense of the completion of focusing, thus allows the user to feel a real pleasure in photographing.

(2) The image processing apparatus, the image processing method, or the image processing program according to the present invention forms the pseudo-image having a resolution lower than that of the image obtained by the image-capturing element, and increases the resolution of the pseudo-image step by step or consecutively to cause the resolution to reach that of the image obtained by the image-capturing element at a focusing position. This makes clear an image variation from the start to the end of focusing operation, offering an improved sense of the completion of focusing.

Other objects, features, and advantages of the present invention will be understood more precisely by referring to the accompanying drawings and embodiments.

BRIEF DESCRIPTION OF THE DRAWINGS

FIGS. 9A and 9B are diagrams of a method for processing a pseudo-image and of the pseudo-image (fourth embodiment).

FIGS. 10A, 10B and 10C are diagrams of another method for processing the pseudo-image and of the pseudo-image (fourth embodiment).

DETAILED DESCRIPTION OF THE PREFERRED EMBODIMENTS

First Embodiment

Figure 1:
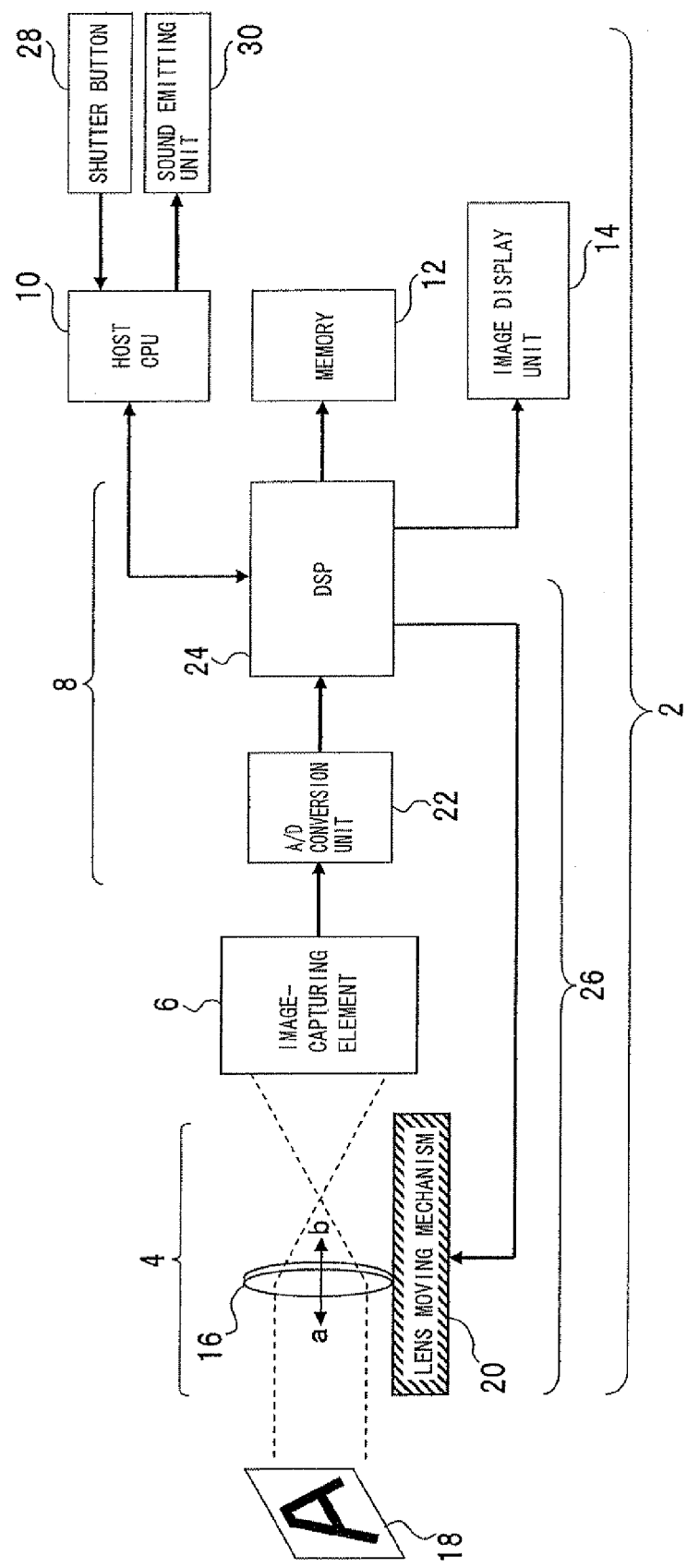
FIG. 1 is a diagram of an image processing apparatus (first embodiment)

A first embodiment of the present invention will now be described with reference to FIG. 1. FIG. 1 is a block diagram of an image processing apparatus according to the first embodiment.

The image processing apparatus 2, which is an AF camera, etc., includes an optical system 4, an image-capturing element 6, an image processing unit 8, a host CPU (Central Processing Unit) (hereinafter "CPU") 10, a memory 12, and an image display unit 14. According to the image processing apparatus 2, an image formed on the image-capturing element 6 through the optical system 4 and a pseudo-image, which will be explained later, are displayed on the image display unit 14.

The optical system 4 has a lens 16, etc., and converges light from a photographed subject 18 through the lens 16 to form an image of the photographed subject 18 on an image-capturing face of the image-capturing element 6. A lens moving mechanism 20 incorporated into the optical system 4 moves the lens 16 to a focusing position and fixes the lens thereto, using autofocus (AF) control output from the image processing unit 8.

The image-capturing element 6 is composed of a CCD (Charge Coupled Device) etc., and converts an image created through the optical system 4 into an electric signal and puts out the signal.

The image processing unit 8 includes an A/D (Analog to Digital) conversion unit 22, and a DSP (Digital Signal Processor) 24. The A/D conversion unit 22 converts an analog image signal put out of the image-capturing element 6 into a digital signal. The DSP 24 is composed of an image processing LSI (Large-Scale Integrated Circuit), and has a ROM (Read-Only Memory) storing various programs including an image processing program, etc. The DSP 24 executes various signal processes including a pseudo-image process, using an image formed on the image-capturing element 6. The signal processes include processes of, for example, (1) taking in the image formed on the image-capturing element 6, displaying/outputting the taken image, saving/outputting a still image of the taken image, (2) forming/outputting a pseudo-image image, and (3) forming/outputting an AF control signal. The process of displaying/outputting the image means display and output of the image on the image display unit 14, and the process of saving/outputting a still image means image output for recording the still image in the memory 12. The memory 12 constitutes an image memory unit, and the image display unit 14 is a monitor.

A pseudo-image is an image showing a resolution variation enlarged to be greater than that of an image obtained by the image-capturing element 6 during AF operation, which is focusing operation of the optical system 4. Specifically, a pseudo-image having a resolution lower than that of an image obtained by the image-capturing element 6 is formed, and the resolution of the pseudo-image is increased step by step or consecutively to cause the resolution to reach that of the image obtained by the image-capturing element 6 at a focusing position for the optical system 4, in which process the resolution variation of the pseudo-image is enlarged in series. This pseudo-image is formed based on the image obtained by the image-capturing element 6 during AF operation of the optical system 4, and is displayed by the image display unit 14. Executing such pseudo-image formation/output, the DSP 24 constitutes the image processing unit for forming a pseudo-image.

An AF control signal is control output to the lens moving mechanism 20, being used to move the optical system 4 to an optimum focusing position. The lens moving mechanism 20 and the DSP 24 jointly constitute a focus controlling unit 26, where the AF control signal is put out to the lens moving mechanism 20 to move the optical system 4 to the optimum focusing position using an image formed on the image-capturing element 6 through the optical system 4.

The CPU 10 serves as a controlling unit. When a shutter button 28 is, for example, put into a half-depressed state, the CPU 10 causes autofocusing (AF) operation to start to control the optical system 4 to locate it at a focusing position. When the shutter button 28 in the half-depressed state is put into a full-depressed sate, the CPU 10 causes the memory 12 to take in an image that is formed on the image-capturing element 6 through the optical system 4 located at the focusing position. The CPU 10 sends an AF command signal to the DSP 24 when the shutter button 28 is in the half-depressed sate, and sends an image take-in command signal to the DSP 24 when the shutter button 28 in the half-depressed state is put into the full-depressed sate.

A sound emitting unit 30 composed of a speaker, etc., is connected to the CPU 10. The sound emitting unit 30 emits a shutter sound indicating shutter operation when the shutter button 28 has been put into the full-depressed state.

In the above structure, when the shutter button 28 is put into the half-depressed state, the CPU 10 detects the half-depressed state, transmitting an AF start signal to the DSP 24 based on the detection. Responding to the AF start signal, the DSP 24 changes its mode into a photographing mode, and the image-capturing element 6 puts out an image formed through the optical system 4. In this case, the image obtained by the image-capturing element 6 is an image of the photographed subject is, which is put out in the form of an analog signal. The output signal is thus converted into a digital signal at the A/D conversion unit 22, and is put into the DSP 24 as image data. The DSP 24 obtains contrast data from the received image data, and puts an AF control signal into the lens moving mechanism 20 on the basis of the contrast data. When the image obtained through the optical system 4 shows a low resolution, the lens moving mechanism 20 moves the lens 16 to an optimum focusing position and fixes the lens 16 thereto on the basis of AF control signal because the contrast of the image is defined according to the low resolution if the lens 16 is not adjusted. Arrows a, b indicate the direction of move of the lens 16 caused by the lens moving mechanism 20.

The DSP 24 forms a pseudo-image independent of an image obtained by the image-capturing element 6 during AF operation of the optical system 4. This pseudo-image is an image showing a resolution variation enlarged to be greater than that of the image (actual image) obtained by the image-capturing element 6 during AF operation of the optical system 4. Specifically, the DSP executes a process of forming a pseudo-image having a resolution lower than that of an image (actual image) obtained by the image-capturing element 6, and increasing the resolution of the pseudo-image step by step or consecutively to cause the resolution to reach that of the image (actual image) obtained by the image-capturing element 6 at a focusing position for the optical system 4.

In handling the actual image and pseudo-image, the DSP 24 displays the image formed on the image-capturing element 6 on the image display unit 14 before AF operation, and displays the pseudo-image on the image display unit 14 on the start of AF operation. The image obtained by the image-capturing element 6 is stored in the memory 12.

In the above manner, the pseudo-image is displayed on the image display unit 14 during AF operation, and the resolution of the pseudo-image is changed widely in response to the progress of AF operation. This makes clear the progress of AF operation as an image variation, which allows a user to vividly observe the image variation during focusing.

Figure 2:
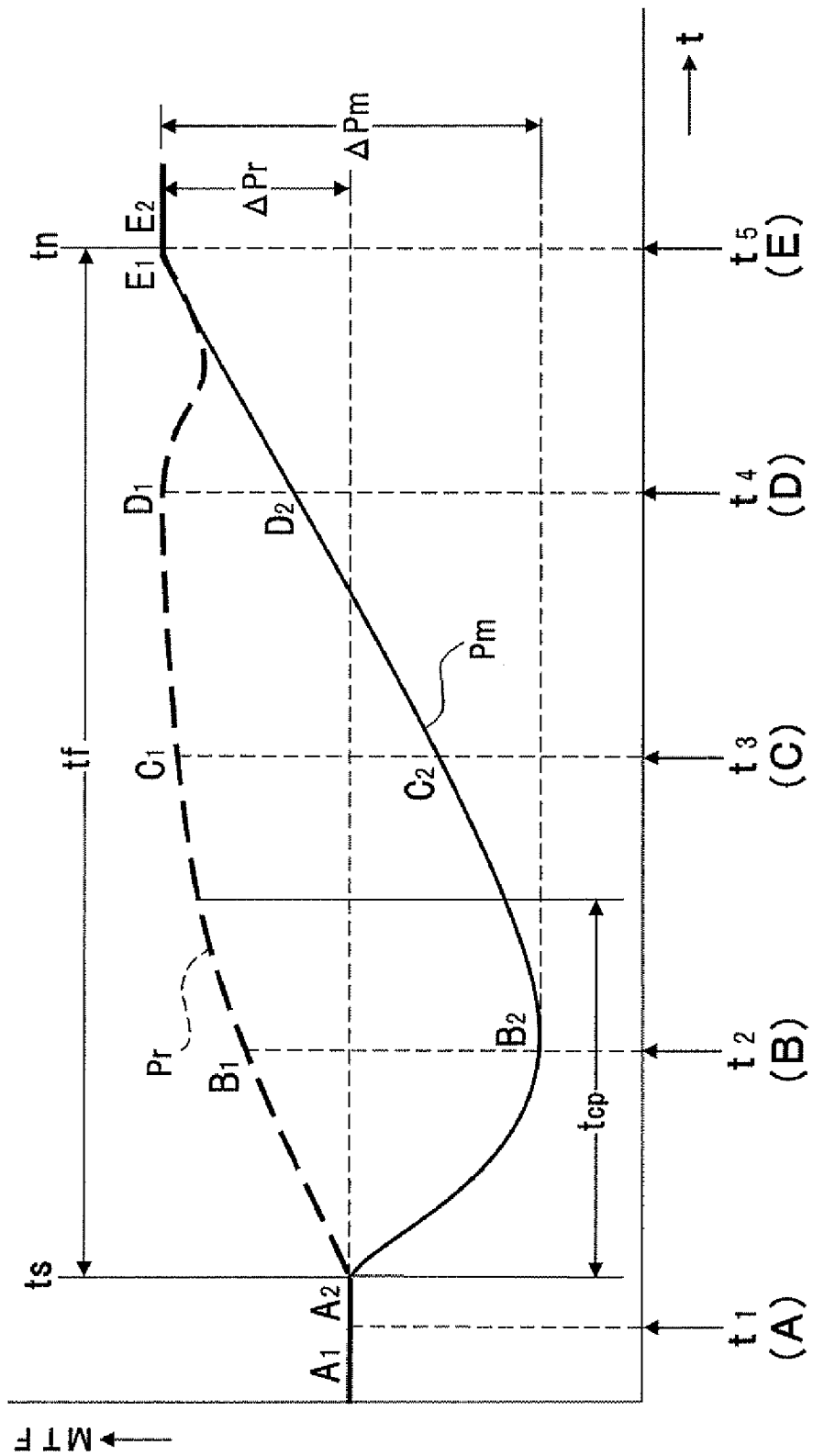
FIG. 2 is a diagram of an MTF on an actual image obtained by an optical system and on a pseudo-image during AF operation (first embodiment).

An image obtained by the image-capturing element 6 and a pseudo-image will then be described with reference to FIG. 2. FIG. 2 is a diagram of a variation in the resolution of an actual image and of a pseudo-image during AF operation, which variation is expressed by a chart having the horizontal axis representing passed time t and the vertical axis representing image resolution (MTF: Modulation Transfer Function).

In FIG. 2, Pr denotes a change in the resolution of an image (actual image: memory image) that is formed on the image-capturing element 6 through the optical system 4 and is taken into the memory 12. Pm denotes a change in the resolution of a pseudo-image formed by the DSP 24.

AF operation is started at a point ts (focusing start point) that the shutter button 28 is put into a half-depressed state, and the optical system 4 is fixed to a focusing position at a point tn (focusing completion point). The section between the focusing start point ts and the focusing completion point tn represents a focus period tf. In this period tf, the resolution Pr of the actual image increases slowly with the progress of AF operation, dips right before the focusing completion point tn, and then reaches the maximum. This dip in the resolution Pr right before focusing completion results from the back and forth move of the optical system 4 that is made to seek for the maximum resolution.

Meanwhile, the DSP 24 receives an image from the image-capturing element 6, and forms a pseudo-image having a lowered resolution. The resolution Pm of the pseudo-image drops widely as the resolution of the image obtained by the image-capturing element 6 increases slowly in response to AF operation of the optical system 4, and increases linearly and slowly from the minimum, then reaches the maximum obtained at the focusing position. As a result, in the course of AF operation, a resolution variation of the actual image is expressed as $\Delta Pr$, while a resolution variation of the pseudo-image is expressed as $\Delta Pm$ ($>\Delta Pr$), which is larger in comparison with that of the actual image. This larger resolution variation appears as the corresponding image change and image quality.

Such a variation in the resolution of an actual image and of a pseudo-image as described above will be described with reference to FIG. 3. A, B, C, D, E in FIG. 3 each denotes a memory image (actual image) and a pseudo-image displayed on the image display unit 14 at each point $t_1$, $t_2$, $t_3$, $t_4$, $t_5$ on the time axis of the chart shown in FIG. 2.

At the point $t_1$, where focusing has not started yet, a memory image 32 and an image 34 appearing on the image display unit 14 become the same images ($A_1$, $A_2$). Specifically, an actual image formed on the image-capturing element 6 is displayed on the image display unit 14 before the start of focusing, because no pseudo-image is formed at this point. This actual image is the memory image 32. In this case, therefore, the memory image 32 is identical with the image 34 on the image display unit 14.

AF operation is in progress at the point $t_2$, at which the resolution of the memory image 32 becomes higher than that shown at the focusing start point ts ($B_1$). Meanwhile, a pseudo-image 36 is formed and displayed on the image display unit 14 as AF operation begins. At the point $t_2$, however, the pseudo-image 36 shows the lowest resolution, appearing as a deteriorated image so inferior as to make a character A unrecognizable ($B_2$).

The point $t_3$ is the middle point of AF operation, where the resolution of the memory image 32 comes close to the resolution shown at the focusing completion point tn ($C_1$). The character A expressed as the memory image 32 is, therefore, sufficiently recognizable at the point $t_3$. In contrast, the pseudo-image 36 at the middle point of AF operation is improved to show a resolution better than the minimum, but the improved resolution is still so low as to manage to reach about the half of the resolution variation $\Delta Pm$. The pseudo-image 36 thus remains a deteriorated image making the character A unrecognizable ($C_2$) at this point.

The point $t_4$ is a point near the end of AF operation, where the resolution of the memory image 32 comes further closer to the resolution shown at the focusing completion point tn ($D_1$). As a result, the character A expressed as the memory image 32 is certainly recognizable at the point $t_4$. In contrast, the pseudo-image 36 at this point is in a state indicating that the pseudo-image 36 is still in the course of focusing, where the resolution of the pseudo-image 36 is improved over the resolution shown at the point $t_3$, but is still so low as to manage to reach about two-thirds of the resolution variation $\Delta Pm$. The pseudo-image 36 thus makes the character A readable, but remains an inferior image ($D_2$).

The point $t_5$ is the focusing completion point tn, at which the resolution of the memory image 32 becomes the maximum. Meanwhile, the resolution of the pseudo-image 36 also reaches the maximum at this point, thus the pseudo-image 36 becomes identical with the image that is formed on the image-capturing face of the image-capturing element 6 upon focusing ($E_1$, $E_2$).

The above change in the resolution of the memory image 32 shows no wide variation in the image. A series of image variations from A to E shown in FIG. 3, therefore, hardly give a user a sense of the completion of focusing. On the other hand, in a series of image variations of the pseudo-image 36 displayed on the image display unit 14, the pseudo-image 36 as a deteriorated image appears on the start of focusing immediately after the appearance of the image 34 right before the start of focusing, and the resolution of the pseudo-image 36 increases step by step as the time axis point proceeds to $t_3$, $t_4$, finally reaching a level far greater than that of the resolution of the initial image 34 at the focusing position $t_5$. These image variations give the user a sense of the completion of focusing.

Figure 4:
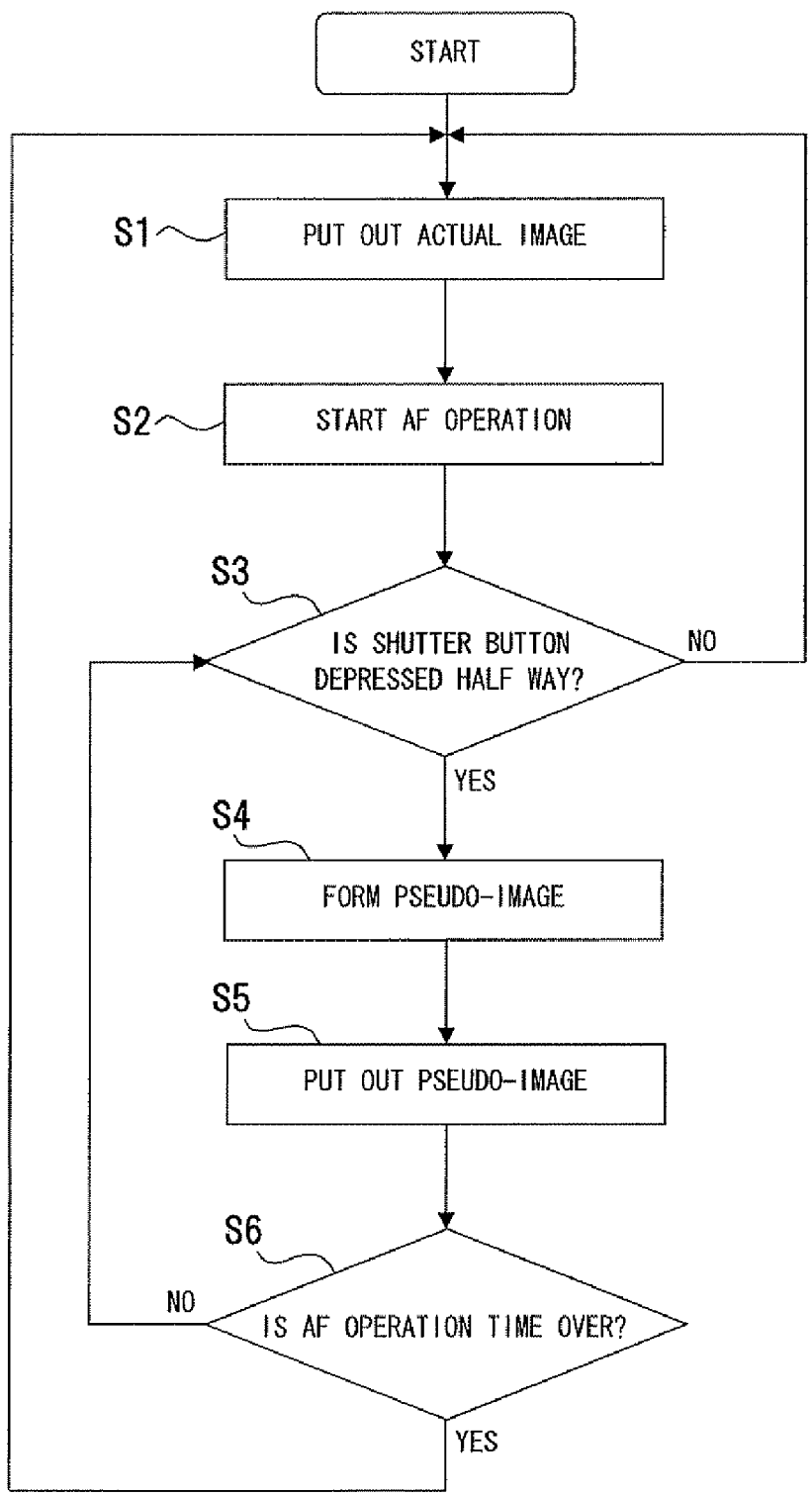
FIG. 4 is a diagram of an example of a process procedure for an image processing method and an image processing program (first embodiment).

An image processing method and an image processing program for an actual image and a pseudo-image will then be described with reference to FIG. 4. FIG. 4 is a flowchart of a process procedure for an image process.

Figure 3:
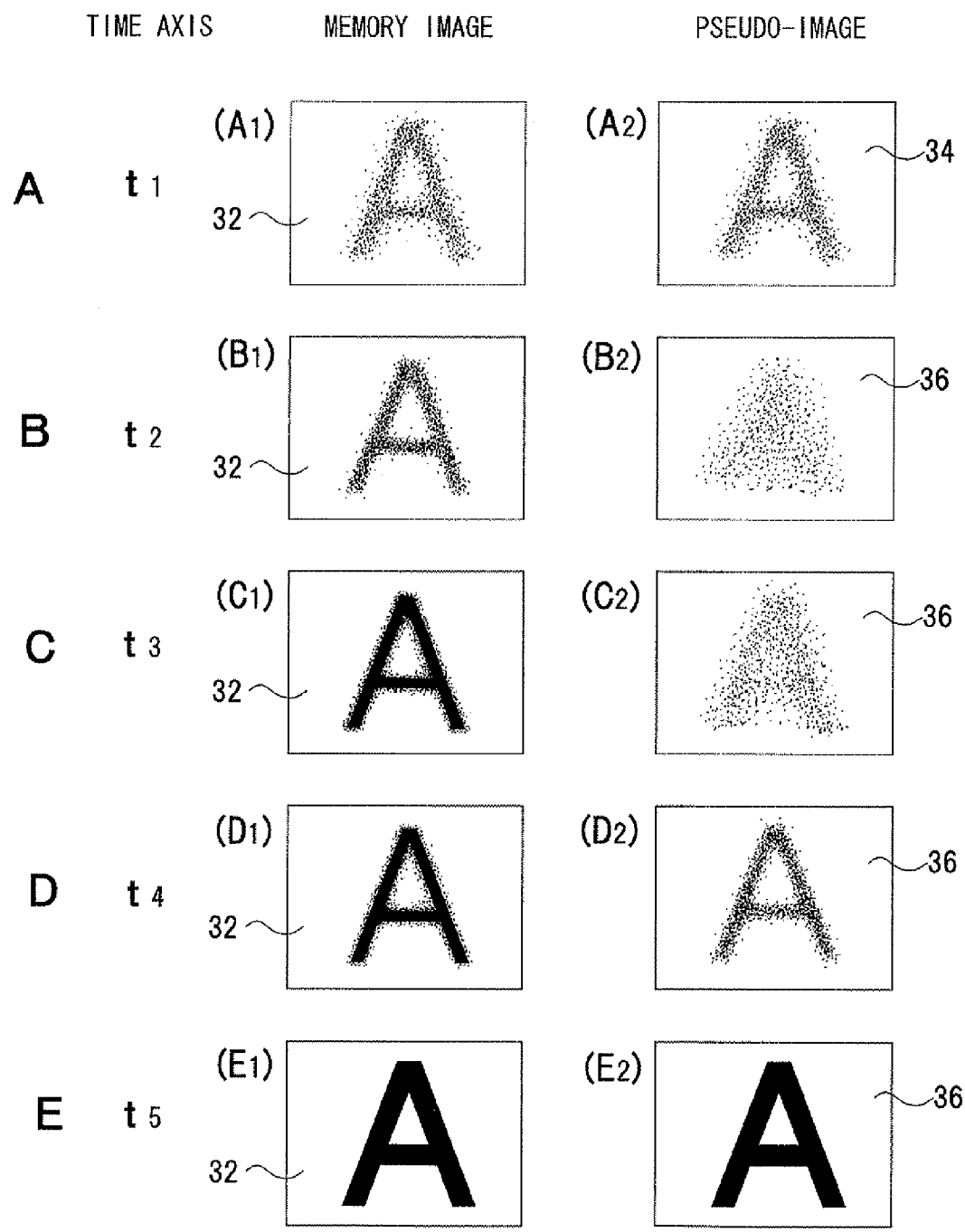
FIG. 3 is a diagram of a variation in a memory image and in a pseudo-image (first embodiment).

When the image processing apparatus 2 is started, an image formed on the image-capturing element 6 through the optical system 4 is put out from the DSP 24 to the image display unit 14 through the A/D conversion unit 22. The image display unit 14, therefore, displays the actual image obtained through the optical system 4 (step S1). Display of the actual image continues till the start of AF operation. When AF operation starts (step S2), whether the shutter button 28 is depressed half way is determined (step S3). Just as the shutter button 28 is put in a half-depressed state, that is, AF operation is started, the operational mode of the image processing apparatus 2 is changed into a pseudo-image 36 forming mode (step S4). The pseudo-image 36 is processed, for example, in such a way that the image obtained by the image-capturing element 6 is multiplied by a factor for deteriorating a resolution (MTF) to produce a pseudo-image showing the lowest resolution at the start of AF operation, and the factor is changed as an AF operation time elapses to increase the resolution so that the pseudo-image is bring closer to the actual image. In this process, the above pseudo-image 36 shown in FIG. 3 is put out and displayed on the image display unit 14 by the DSP 24 (step S5). This process continues until the AF operation time is over (step S6). When the AF operation time is over, display of the pseudo-image 36 ends, and the process procedure returns to step S1, at which an image formed on the image-capturing element 6 through the optical system 4 is displayed.

As described above, displaying the pseudo-image 36 on the image display unit 14 showing a wide variation in its resolution during AF operation allows a user to visually recognize a state of focusing during AF operation and have a satisfactory sense of the completion of focusing.

Second Embodiment

Figure 5:
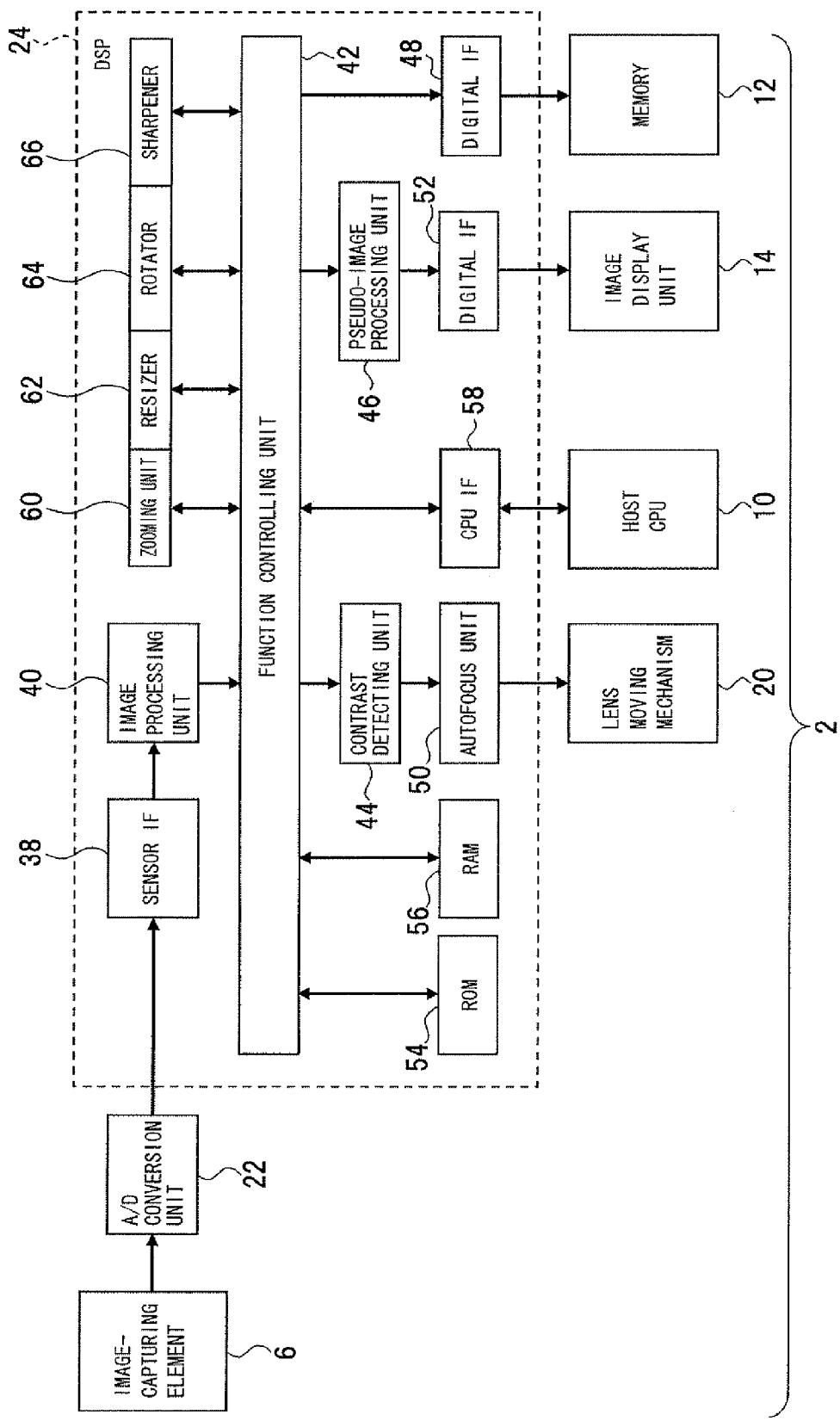
FIG. 5 is a diagram of the structure of an image processing apparatus (second embodiment)

A second embodiment of the present invention will be described with reference to FIG. 5. FIG. 5 is a block diagram of an image processing apparatus according to the second embodiment. In FIG. 5, the same components as shown in FIG. 1 are denoted by the same reference numerals.

The second embodiment exhibits the specific structure of the DSP 24 of the image processing apparatus 2 according to the first embodiment.

A digitized image is put into the DSP 24 through the A/D conversion unit 22. The image is sent to a contrast detecting unit 44, and to a pseudo-image processing unit 46 via a sensor interface (IF) 38, an image process unit 40, and a function controlling unit 42, and is also sent to the memory 12 through a digital interface (IF) 48. The sensor IF 38 is an input unit that receives an image signal from the A/D conversion unit 22, serving as a buffer for image signal input to the image process unit 40. The function controlling unit 42 is composed of a bus.

The contrast detecting unit 44 detects the contrast of an image, outputting a contrast detection signal to an autofocus unit 50. The autofocus unit 50 forms an autofocus (AF) control signal based on the level of the detection signal, and puts out the AF control signal to the lens moving mechanism 20. Through such a signal process, the optical system 4 is controlled to be located at a focusing position, using an image formed on the image-capturing element 6 as control information. During this AF operation, the image formed on the image-capturing element 6 is sequentially taken into the DSP 24, and is taken into the memory 12 and into the pseudo-image processing unit 46 as described above.

The pseudo-image processing unit 46 forms a pseudo-image corresponding to a variation in the resolution of an image during AF operation, and the pseudo-image is put out to the image display unit 14 through the digital IF 52 and is displayed on the image display unit 14. The pseudo-image is displayed on the image display unit 14 in replacement of an actual image during AF operation. The pseudo-image processing unit 46, therefore, causes the image display unit 14 to display the actual image before and after AF operation. This means that the pseudo-image processing unit 46 transmits the actual image and causes the image display unit 14 to display the actual image in a mode other than an AF operation mode.

The DSP 24 according to the present embodiment is provided with recording media of ROM (Read-Only Memory) 54 and RAM (Random Access Memory) 56. The ROM 54 stores various programs including the image processing program, while the RAM 56 stores control data, etc., from the CPU 10, which is connected to the function controlling unit 42 via a CPU interface (IF) 58. The DSP 24 also includes a zooming unit 60, a resizer 62, a rotator 64, and a sharpener 66, which are connected to the function controlling unit 42. The zooming unit 60 executes a process of magnifying/demagnifying a taken image. The resizer 62 executes a process of changing the size of an image, changing, for example, a taken image having a million pixels into an image having a hundred of thousands of pixels. The rotator 64 executes a process of rotating an image, and the sharpener 66 executes such a process as highlighting the outline of an image.

Figure 6:
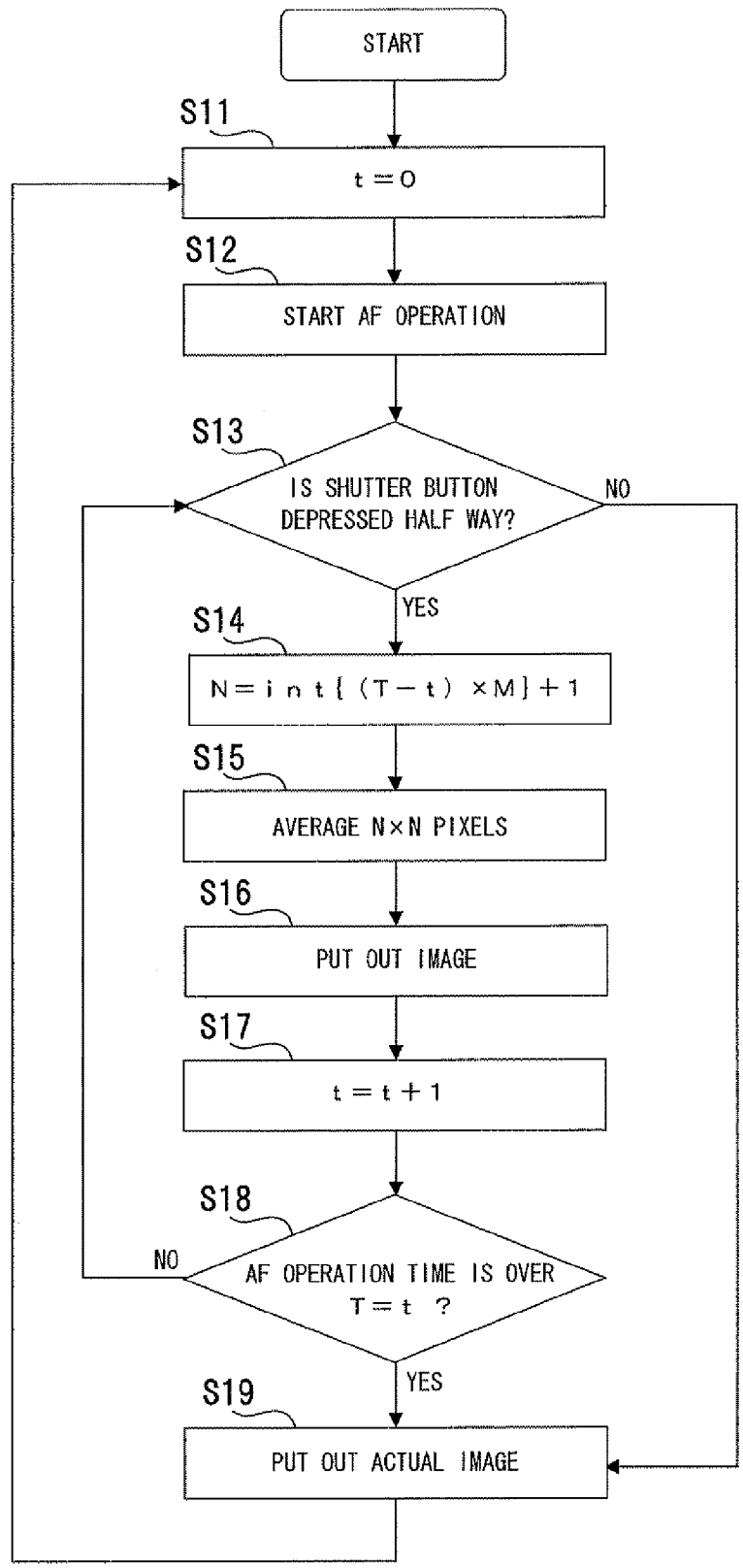
FIG. 6 is a flowchart of a process procedure for a pseudo-image process (second embodiment).

An image process executed at the pseudo-image processing unit 46 will be described with reference to FIG. 6. FIG. 6 is a flowchart of a process procedure for pseudo-image display, etc.

A digitized image is put into the DSP 24 through the A/D conversion unit 22. The image is then sent to the pseudo-image processing unit 46, and is taken into the memory 12. In this state, when AF operation starts (step S12) at t=0 (step S11), whether the shutter button 28 (FIG. 1) is depressed half way is determined (step S13). When the shutter button 28 (FIG. 1) is kept in a half-depressed state, AF operation starts, at which the operational mode is changed over to a pseudo-image forming process mode. While AF operation is going on, a pseudo-image is formed and is displayed on the image display unit 14 (step S14 to S18). When AF operation is over, an actual image is displayed on the image display unit 14 (step S19).

In this pseudo-image forming process, for example, a process of averaging the number of pixels against the pixel arrangement is carried out. The number of pixels N is given by $$N = int\{(T-t) \times M\} + 1 \qquad \text{Equation (1)}$$

where t is passed time, N is the number of pixels to be averaged, T is AF operation time (=fixed value), and M is a factor for adjustment to the screen (=fixed value). This calculation equation (1) is used to calculate the number of pixels N (step S14).

During AF operation, (N×N) pixels are averaged using the number of pixels N determined by the equation (1) (step S15). A pseudo-image obtained by the pixel averaging is then put out, and is displayed on the image display unit 14 (step S16).

According to the equation (1), the resolution of the pseudo-image changes as time passes with an increment of time t (step S17). The pseudo-image process is continued till the end of AF operation time (step S13 to S18). When T=t is satisfied (step S18), the equation (1) is turned into $$N = int(0 \times M) + 1 = 1 \qquad \text{Equation (2)}$$

At this point, the pseudo-image is automatically changed into an actual image, which is then displayed on the image display unit 14 in replacement of the pseudo-image (step S19).

Figure 7:
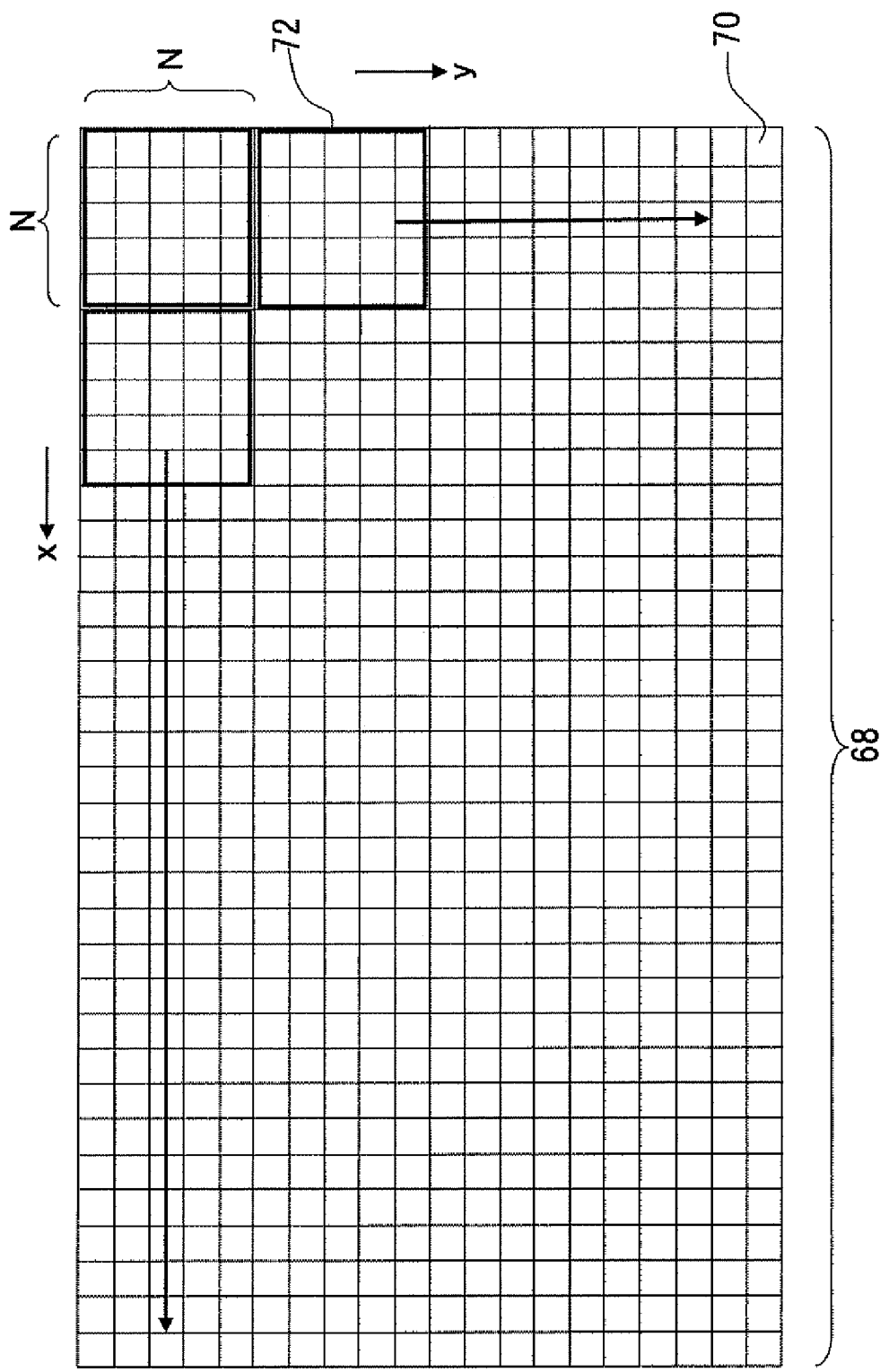
FIG. 7 is an example of the pseudo-image process (second embodiment).

The relation between the number of pixels and a resolution variation in the above image process will be described with reference to FIG. 7. FIG. 7 is a diagram of a change in pixel arrangement and in a pseudo-image.

On the image display unit 14, a multiplicity of pixels 70 are arranged in a matrix pattern to form a pixel arrangement 68. When the number of pixels N is calculated from the equation (1), mosaics 72 each consisting of (N×N) pixels 70, (N×N) being an integer, are formed in the pixel arrangement 68, as shown in FIG. 7. The number of pixels N decreases as time t passes, which is readily concluded from the equation (1), so that the size of each mosaic 72 determined by the number of pixels N×N gets smaller with the passage of time t. As a result, the pseudo-image formed of mosaics 72 comes close to the actual image. In other words, the pseudo-image changes into the actual image when the AF operation time is over.

Third Embodiment

Figure 8:
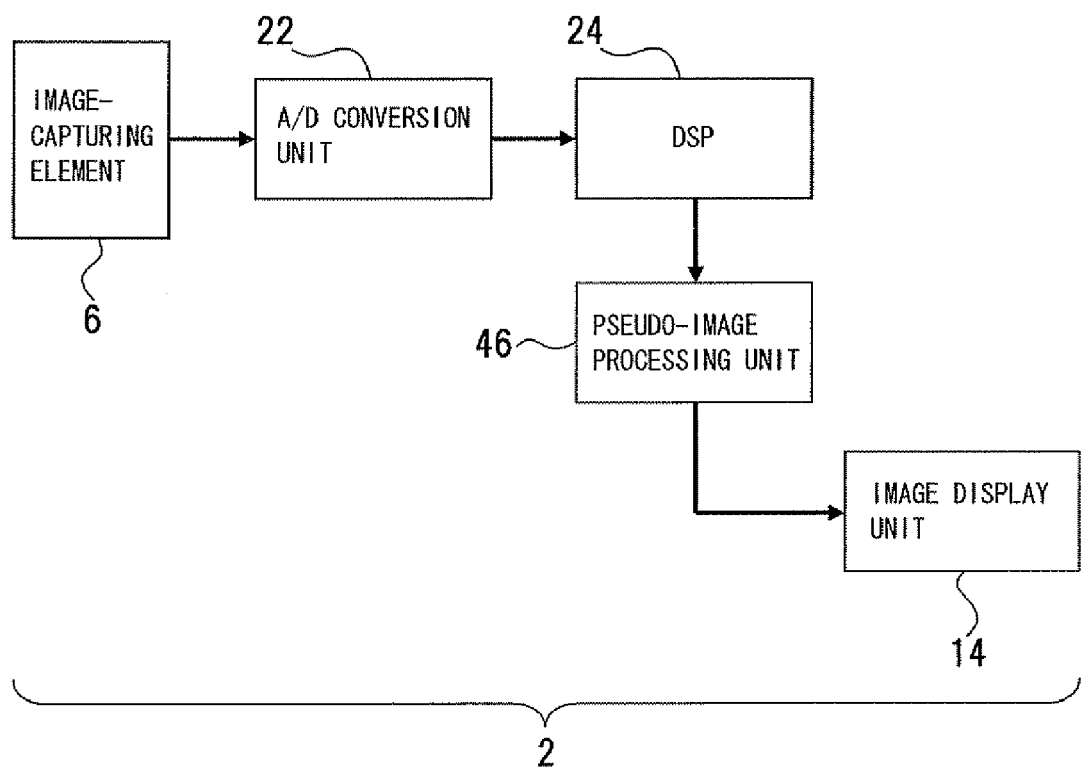
FIG. 8 is a diagram of the structure of an image processing apparatus (third embodiment).

A third embodiment of the present invention will be described with reference to FIG. 8. FIG. 8 is a block diagram of an image processing apparatus according to a third embodiment. In FIG. 8, the same components as shown in FIG. 1 are denoted by the same reference numerals.

According to the image processing apparatus 2 of the first embodiment, the DSP 24 executes the pseudo-image forming process. According to the image processing apparatus 2 of the second embodiment, the DSP 24 has the pseudo-image processing unit 46 incorporated therein. In contrast, according to the third embodiment, as shown in FIG. 8, the pseudo-image processing unit 46 is disposed outside the DSP 24 to be interposed between the DSP 24 and the image display unit 24. When the pseudo-image processing unit 46 is disposed outside the DSP 14, an image formed on the image-capturing element 6 is put into the pseudo-image processing unit 46 via the DSP 24 to display a pseudo-image as described above. In this case, the pseudo-image processing unit 46 may include a ROM and a CPU that are built inside the pseudo-image processing unit 46 and store programs for processing a pseudo-image.

Fourth Embodiment

A fourth embodiment of the present invention will be described with reference to FIGS. 9, 10. FIGS. 9, 10 are diagrams of a method for processing a pseudo-image and of the pseudo-image.

The first to third embodiments give the description of a pseudo-image that is centered on a resolution (MTF) variation. The pseudo-image 36, however, may be formed, for example, as a blurred (gauss) image 74 shown in FIG. 9A, or as a blurred (moving) image 76 shown in FIG. 9B, or as a roughly drawn image 78 shown in FIG. 10A, or as a diffused image 80 shown in FIG. 10B, or as a winded image 82 shown in FIG. 10C.

In the above image process, an image adjustment function of the DSP 24 may be utilized to make use of such image processing techniques as changing the gain of an image process system, changing light/shade and brightness, averaging or compressing an image, contrasting or highlighting an outline, and interlacing (thinning-out). In the contrasting or outline highlighting process, the blurred outline of an image is highlighted to produce an image quality change. In the interlacing (thinning-out) process, pixels of an image are thinned out to produce an image quality change to turn the image into a pseudo-image.

Fifth Embodiment

Figure 11:
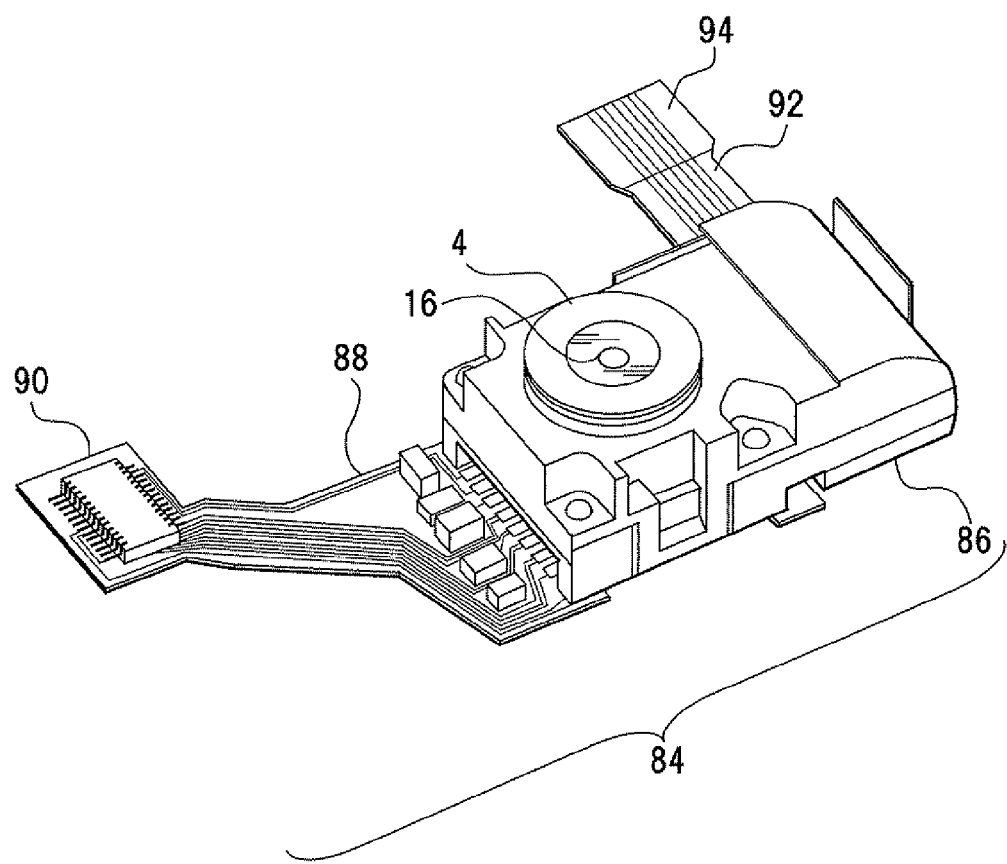
FIG. 11 is a perspective view of an image processing unit (fifth embodiment).

A fifth embodiment of the present invention will be described with reference to FIG. 11. FIG. 11 is a structural example of an image processing unit.

The image processing unit 84, which serves as a camera functional unit, has a case 86 made of a hard synthetic resin, etc. The optical system 4 is mounted on the front face of the case 86, and the lens moving mechanism 20 (FIG. 1) is installed in the case 86. The optical system 4 has the lens 16, as mentioned before, and the case 86 contains the image-capturing element 6, the A/D conversion unit 22, the DSP 24 (FIG. 1) having the above mentioned pseudo-image processing function, etc. A substrate 88 is mounted on the back face of the case 86, and is provided with a connector 90. A flexible substrate 92 is attached to the substrate 88, and is provided with a connector 94 on the front end of the flexible substrate 92. The image processing unit 84 is connected to the CPU 10, the memory 12, the image display unit 14, etc., through the connectors 90, 94.

Use of the image processing unit 84 allows a user to obtain pseudo-image output corresponding to AF operation during AF operation, thus have a satisfactory sense of the completion of focusing as described above.

Sixth Embodiment

Figure 12:
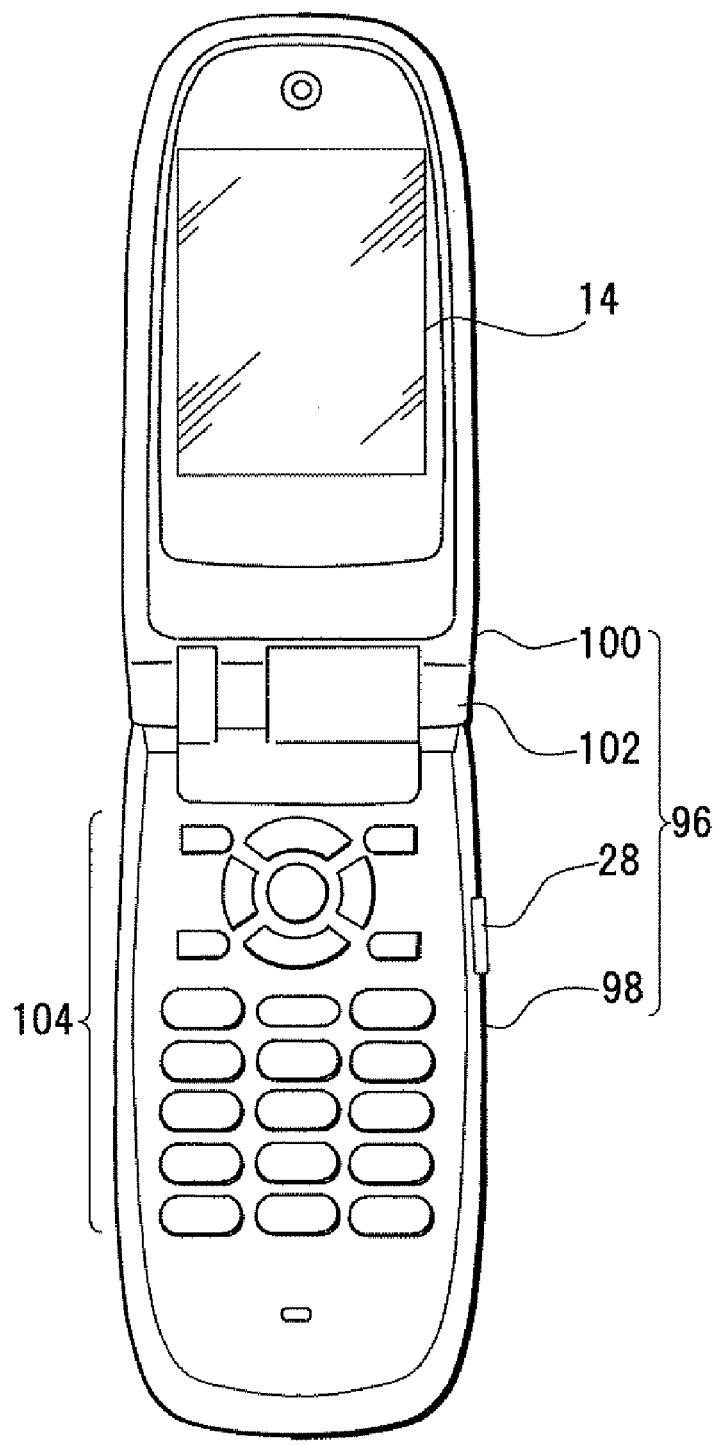
FIG. 12 is a diagram of a cellular phone equipped with an image processing apparatus, which cellular phone is put in an open state (sixth embodiment).
Figure 13:
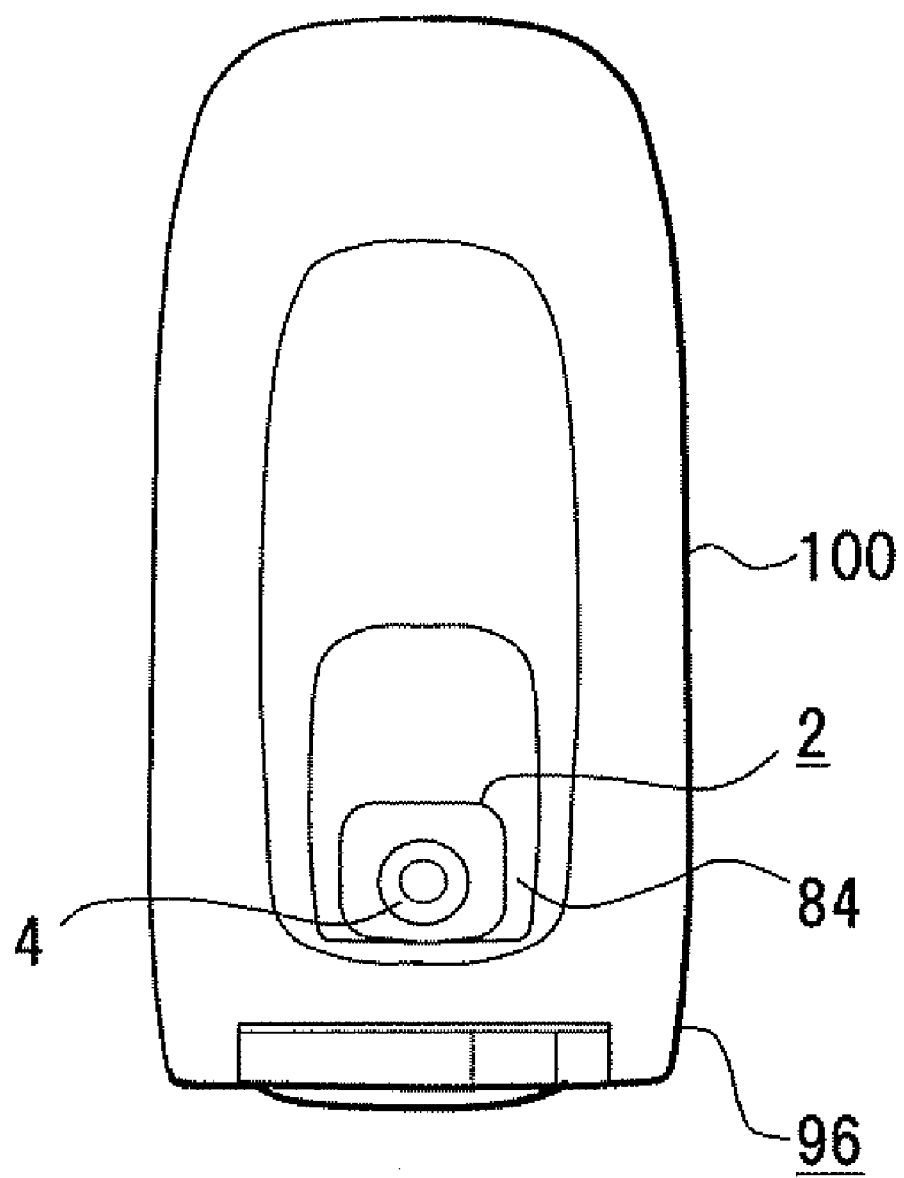
FIG. 13 is a diagram of the back face of the cellular phone equipped with the image processing apparatus, which cellular phone is put in a closed state (sixth embodiment)

A sixth embodiment of the present invention will be described with reference to FIGS. 12, 13. FIGS. 12, 13 are structural examples of a cellular phone equipped with an image processing apparatus. FIG. 12 depicts the cellular phone in an open state, and FIG. 13 depicts the cellular phone in a closed state.

The cellular phone 96 has first and second cases 98, 100, which are opened and closed with a hinge 102. The case 98 includes an input operating unit 104 having the shutter button 28, a cursor key, dial buttons, etc., and the case 100 includes the image display unit 14. The image processing apparatus 2 is mounted on the back face of the case 100, and has the above image processing unit 84. The case 100 contains the aforementioned image processing unit 8.

This cellular phone 96 equipped with the image processing apparatus 2 displays the above described pseudo-image during AF operation carried out by depressing the shutter button half way, allowing a user to have a satisfactory sense of the completion of focusing in AF operation.

Seventh Embodiment

Figure 14:
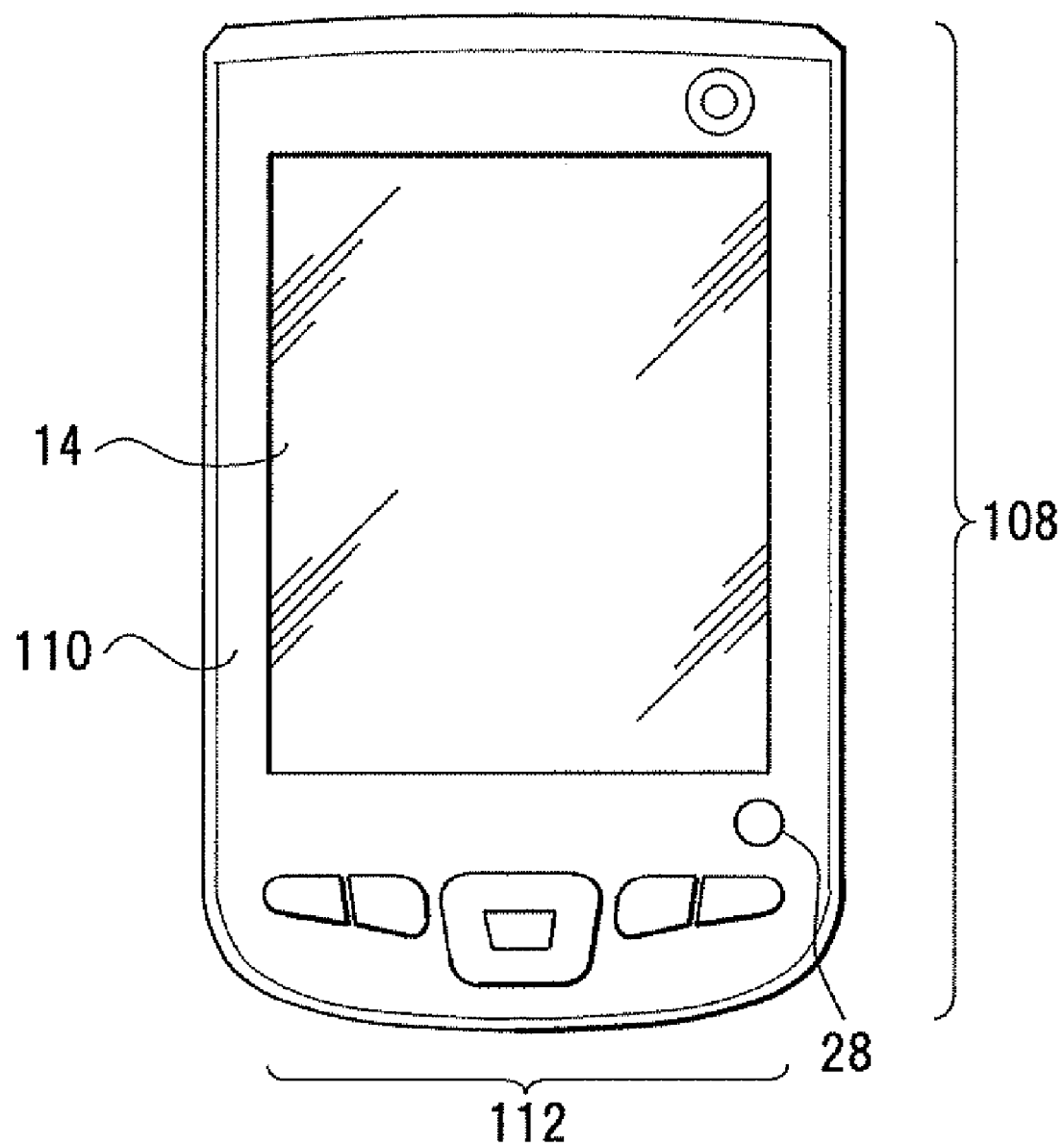
FIG. 14 is a front view of a PDA equipped with an image processing apparatus (seventh embodiment).
Figure 15:
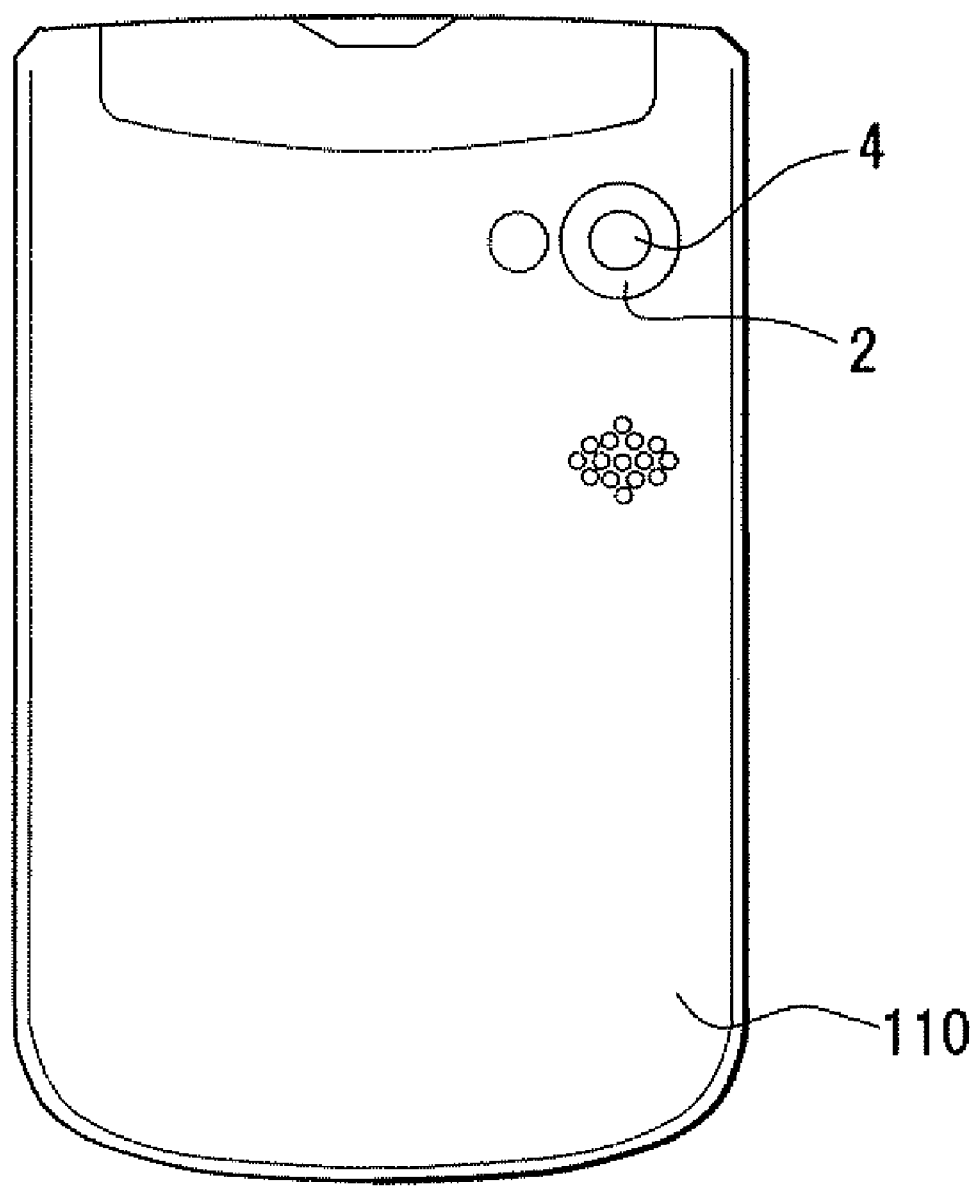
FIG. 15 is a rear view of the PDA equipped with the image processing apparatus (seventh embodiment).

A seventh embodiment of the present invention will be described with reference to FIGS. 14, 15. FIGS. 14, 15 are structural examples of a PDA equipped with an image processing apparatus. FIG. 14 is a front view of the PDA, and FIG. 15 is a rear view of the PDA.

The PDA 108 has a case 110. The front face of the case 110 has the image display unit 14, and an input operating unit 112 including the shutter button 28 and a plurality of keys. The back face of the case 110 has the optical system 4 of the image processing apparatus 2 built inside the case 110, which optical system 4 is exposed out of the back face. The case 110 contains the image processing unit 84, and the above image processing unit 8.

This PDA 108 equipped with the image processing apparatus 2 displays the above described pseudo-image during AF operation carried out by depressing the shutter button half way, allowing a user to have a satisfactory sense of the completion of focusing in AF operation.

Eighth Embodiment

Figure 16:
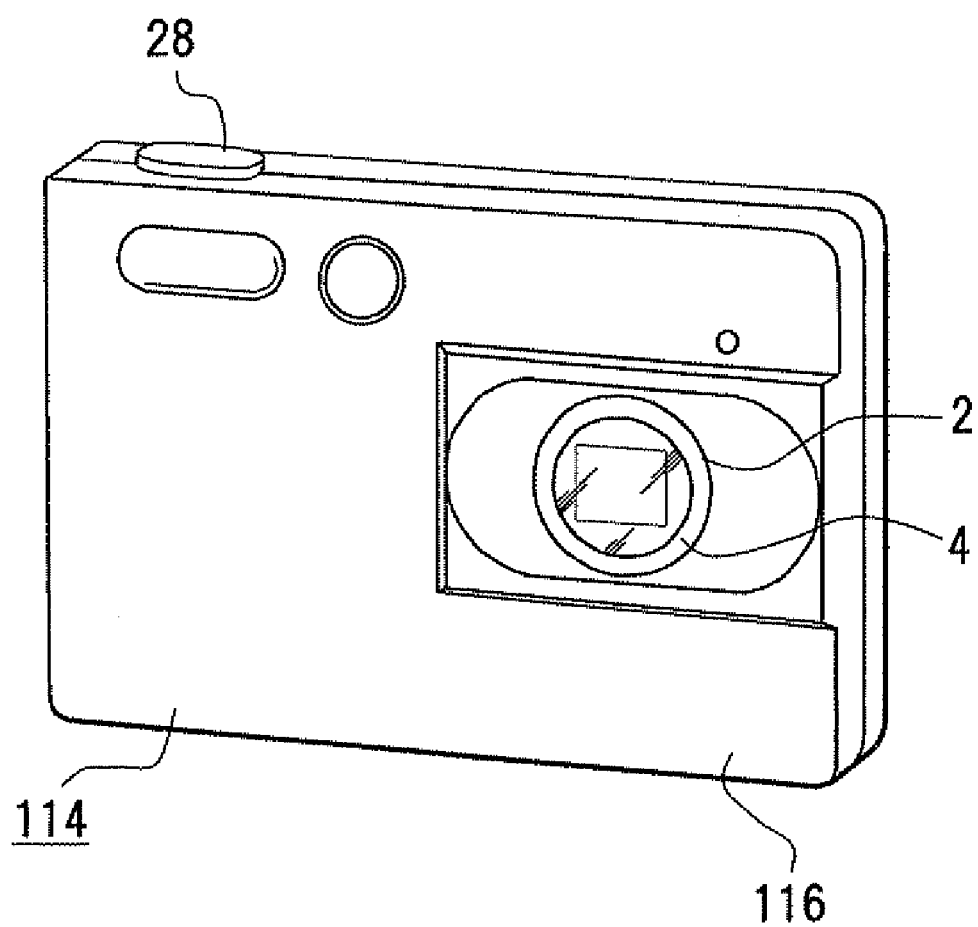
FIG. 16 is a front view of a digital camera (eighth embodiment).
Figure 17:
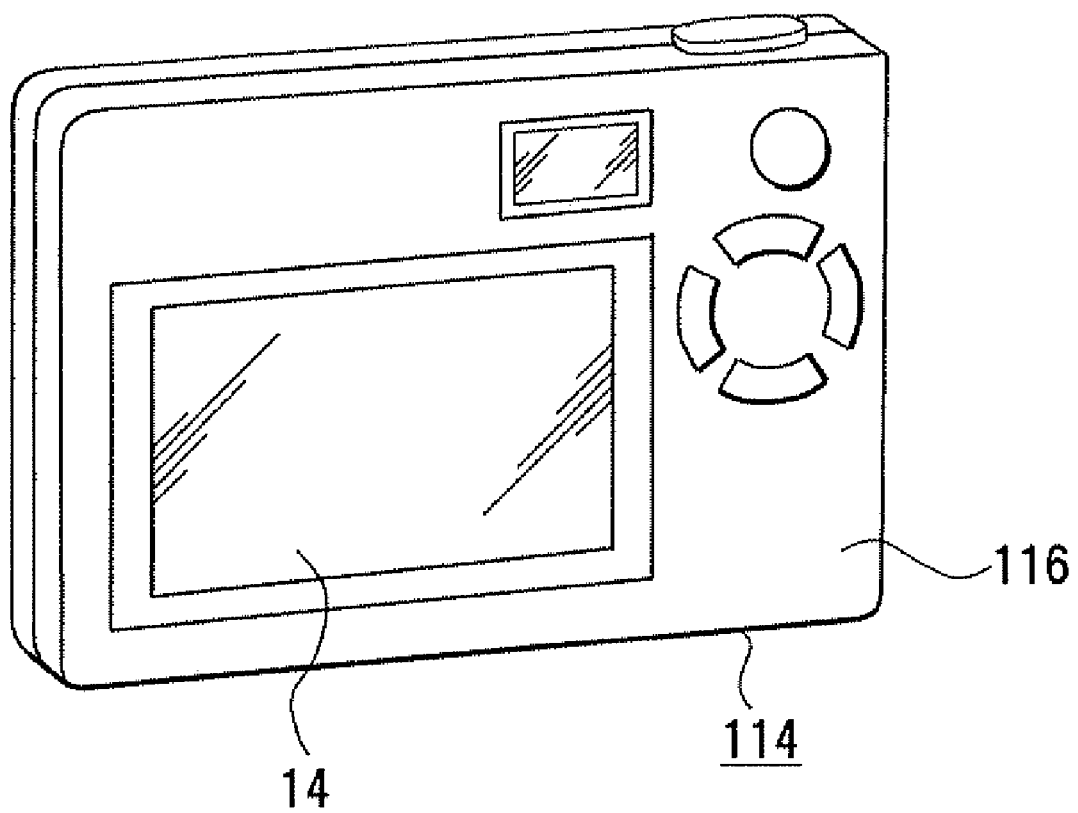
FIG. 17 is a rear view of the digital camera (eighth embodiment).

An eighth embodiment of the present invention will be described with reference to FIGS. 16, 17. FIGS. 16, 17 are structural examples of a digital camera. FIG. 16 is a front view of the digital camera, and FIG. 17 is a rear view of the digital camera.

The digital camera 114 has a case 116 provided with the image processing apparatus 2. The front face of the case 116 has the optical system 4, and the shutter button 28, etc., mounted on the upper side of the front face. The back face of the case 116 has the image display unit 14 serving as a finder.

This digital camera 114 displays the above described pseudo-image during AF operation carried out by depressing the shutter button half way, allowing a user to have a satisfactory sense of the completion of focusing in AF operation.

The features, advantages, and modifications of the embodiments described above will then be enumerated for further description.

(1) According to the image processing apparatus described above, an image on the monitor is intentionally processed digitally, using the DSP 24 and software, to change the resolution of the image in the course of AF operation in providing a specific effect of bringing the image in focus step by step in line with the progress of AF operation. This variation in a state of focus gives a user an enhanced sense of the completion of focusing, thus offering a sense of presence in photographing.

(2) In the first and second embodiments, the start of AF operation (step S2 or S12) and the determination on half-way depression of the shutter button (step S3 or S13) are executed as steps independent from each other. The start of AF operation and the determination on half-way depression of the shutter button, however, may be executed at a single step.

(3) An image signal obtained by the image-capturing element 6 is put out to two kinds of components of the image display unit 14 and the memory 12 for storing a still image. An actual image is stored in the memory 12, and a pseudo-image, which is an image for providing a specific effect, has no connection with a recorded image. This means that data in the memory 12 is saved as a photographed image when the shutter button 28 is depressed upon AF operation, so that an image intentionally blurred by the DSP 24 is not saved in the memory 12. The pseudo-image, however, can be stored in a separate memory.

(4) During AF operation, a pseudo-image starts as a highly deteriorated image and is brought closer to an actual image as time passes. This process leads a user to think that a subject is getting into focus. Since the actual image is displayed at the end of AF operation, the user sees no trace of the pseudo-image, recognizing the displayed actual image as an image completely in focus.

(5) As AF operation proceeds, a user visually recognizes that an image is brought in focus step by step. In this manner, a sense of presence in observing a shift/change in focus is created as a specific effect, which improves the feeling of the user in operation.

(6) The above image processing apparatus 2 is structured to have the memory 12 built inside the image processing apparatus 2. When the image processing apparatus 2 is incorporated into such a device having an original memory as cellular phone, PDA, and personal computer, however, the memory 12 can be replaced with the original memory.

While the most preferred embodiments of the present invention have been described, the description is not intended to limit the present invention. Various modifications and revisions of the embodiments can be made by those skilled in the techniques in accordance with the points and gist of the invention that are described in the claims or disclosed in the embodiments best for the implementation of the invention. These modifications and revisions surely fall within the true scope of the present invention.

The image processing apparatus, image processing method, and image processing program according to the present invention relate to the image process executed in an autofocus camera, etc. The processing apparatus, method, and program make visually clear a change in focus through a variation in the resolution of a pseudo-image in a process of bringing a displayed image in focus, giving a user a sense of the completion of focusing and a sense of presence in photographing, thus offering practical advantages.

What is claimed is:

1. An image processing apparatus comprising:
   an image-capturing element that puts out an image formed through an optical system;
   a focus controlling unit that controls the optical system to locate it at a focusing position, using the image obtained by the image-capturing element through the optical system; and
   an image processing unit that forms a pseudo-image during focusing operation of the optical system caused by the focus controlling unit, the pseudo-image showing a resolution variation enlarged to be greater than that of the image obtained by the image-capturing element.

2. The image processing apparatus of claim 1, the processing apparatus further including a memory unit that stores the image obtained by the image-capturing element.

3. An image processing apparatus comprising:
   an image-capturing element that puts out an image formed through an optical system;
   a focus controlling unit that controls the optical system to locate it at a focusing position, using the image obtained by the image-capturing element through the optical system; and
   an image processing unit that forms a pseudo-image during focusing operation of the optical system caused by the focus controlling unit, the pseudo-image having a resolution lower than that of the image obtained by the image-capturing element, and that increases the resolution of the pseudo-image step by step or consecutively to cause the resolution to reach that of the image obtained by the image-capturing element at the focusing position.

4. An image processing method comprising the processes of:
   outputting an image that is formed on an image-capturing element through an optical system;
   controlling the optical system to locate it at a focusing position, using the resolution of the image obtained by the image-capturing element through the optical system as control information; and
   forming a pseudo-image during focusing operation of the optical system, the pseudo-image showing a resolution variation enlarged to be greater than that of the image obtained by the image-capturing element.

5. The image processing method of claim 4, comprising the process of causing a memory unit to store the image obtained by the image-capturing element.

6. An image processing method comprising the processes of:
   outputting an image that is formed on an image-capturing element through an optical system;
   controlling the optical system to locate it at a focusing position, using the resolution of the image obtained by the image-capturing element through the optical system as control information;

forming a pseudo-image during focusing operation of the optical system, the pseudo-image having a resolution lower than that of the image obtained by the image-capturing element; and increasing the resolution of the pseudo-image step by step or consecutively to cause the resolution to reach that of the image obtained by the image-capturing element at the focusing position.

7. An image processing program, stored in a computer readable medium, for executable by a computer, comprising the steps of:

taking in an image that is formed on an image-capturing element through an optical system;

forming control information for controlling the optical system to locate it at a focusing position, using resolution information of the image obtained by the image-capturing element through the optical system; and forming a pseudo-image during focusing operation of the optical system, the pseudo-image showing a resolution variation greater than that of the image obtained by the image-capturing element.

8. The image processing program of claim 7, the program including the step of causing a memory unit to store the image obtained by the image-capturing element.

9. An image processing program, stored in a computer readable medium, for executable by a computer, comprising the steps of:

taking in an image that is formed on an image-capturing element through an optical system;

forming control information for controlling the optical system to locate it at a focusing position, using resolution information of the image obtained by the image-capturing element through the optical system; and forming a pseudo-image during focusing operation of the optical system, the pseudo-image having a resolution lower than that of the image obtained by the image-capturing element; and increasing the resolution of the pseudo-image step by step or consecutively to cause the resolution to reach that of the image obtained by the image-capturing element at the focusing position.

* * * * *

UNITED STATES PATENT AND TRADEMARK OFFICE
CERTIFICATE OF CORRECTION

PATENT NO.         : 7,438,230 B2                                         Page 1 of 1
APPLICATION NO. : 11/686045
DATED              : October 21, 2008
INVENTOR(S)        : Masashi Saijo et al.

It is certified that error appears in the above-identified patent and that said Letters Patent is hereby corrected as shown below:

On the Title Page, Item (63) (Related U.S. Application Data), Line 1, change "PCT/JP2004/133365," to --PCT/JP2004/13365,--.

Signed and Sealed this

Third Day of February, 2009

JOHN DOLL
*Acting Director of the United States Patent and Trademark Office*